United States Patent
Woodlief et al.

(10) Patent No.: US 11,958,070 B2
(45) Date of Patent: Apr. 16, 2024

(54) MELTER WITH SELF-CLEANING FILTER

(71) Applicant: Nordson Corporation, Westlake, OH (US)

(72) Inventors: Robert J. Woodlief, Duluth, GA (US); Enes Ramosevac, Duluth, GA (US); Peter W. Estelle, Duluth, GA (US)

(73) Assignee: Nordson Corporation, Westlake, OH (US)

( * ) Notice: Subject to any disclaimer, the term of this patent is extended or adjusted under 35 U.S.C. 154(b) by 22 days.

(21) Appl. No.: 17/761,747

(22) PCT Filed: Sep. 17, 2020

(86) PCT No.: PCT/US2020/051226
§ 371 (c)(1),
(2) Date: Mar. 18, 2022

(87) PCT Pub. No.: WO2021/055570
PCT Pub. Date: Mar. 25, 2021

(65) Prior Publication Data
US 2022/0339661 A1    Oct. 27, 2022

Related U.S. Application Data

(60) Provisional application No. 62/903,383, filed on Sep. 20, 2019.

(51) Int. Cl.
*B05C 11/10* (2006.01)
*B05B 15/40* (2018.01)
*B29B 13/02* (2006.01)

(52) U.S. Cl.
CPC .......... *B05C 11/1042* (2013.01); *B05B 15/40* (2018.02); *B29B 13/022* (2013.01)

(58) Field of Classification Search
CPC . B05C 11/1042; B05C 11/1039; B05B 15/40; B29B 13/022; B01D 46/30
See application file for complete search history.

(56) References Cited

U.S. PATENT DOCUMENTS

| | | | |
|---|---|---|---|
| 6,039,217 A | 3/2000 | Faulkner et al. | |
| 6,371,174 B1 | 4/2002 | Zook et al. | |

(Continued)

FOREIGN PATENT DOCUMENTS

| | | |
|---|---|---|
| CN | 101361416 A | 2/2009 |
| CN | 104066517 A | 9/2014 |

(Continued)

OTHER PUBLICATIONS

IPEA/409—International Preliminary Report on Patentability dated Mar. 31, 2022 for WO Application No. PCT/US20/051226.

(Continued)

*Primary Examiner* — Vishal Pancholi
(74) *Attorney, Agent, or Firm* — BakerHostetler

(57) ABSTRACT

In one example, a melter has a housing, a heater, a vent, and a filter medium. The housing defines a receiving space that supports adhesive therein. The heater heats the receiving space of the housing to melt the adhesive. The melter defines an adhesive inlet therein that receives adhesive carried by a transport supply gas into the receiving space. The vent extends through a wall of the melter and permits the transport supply gas to escape from the melter. The filter medium is supported in the vent to capture particulates from the transport supply gas escaping the receiving space, and is positioned relative to the receiving space such that heat from the receiving space causes the particulates captured by the filter medium to melt and fall into the receiving space.

12 Claims, 14 Drawing Sheets

(56) References Cited

U.S. PATENT DOCUMENTS

| | | | |
|---|---|---|---|
| 2009/0095730 A1 | 4/2009 | Ganzer et al. | |
| 2009/0185348 A1 | 7/2009 | Bretschneider et al. | |
| 2016/0121358 A1 | 5/2016 | Gould et al. | |
| 2016/0221023 A1 | 8/2016 | Ross et al. | |
| 2019/0060949 A1 | 2/2019 | Hagita et al. | |

FOREIGN PATENT DOCUMENTS

| | | |
|---|---|---|
| CN | 105562296 A | 5/2016 |
| CN | 106731308 A | 5/2017 |
| CN | 108131753 A | 6/2018 |
| EP | 1226875 A2 | 7/2002 |
| EP | 3108968 A1 | 12/2016 |

OTHER PUBLICATIONS

ISA/206—Invitation to Pay Additional Fees dated Jan. 12, 2021 for WO Application No. PCT/US20/051226.

ISA/220—Notification of Transmittal or Search Report and Written Opinion of the ISA, or the Declaration dated Mar. 23, 2021 for WO Application No. PCT/US20/051226.

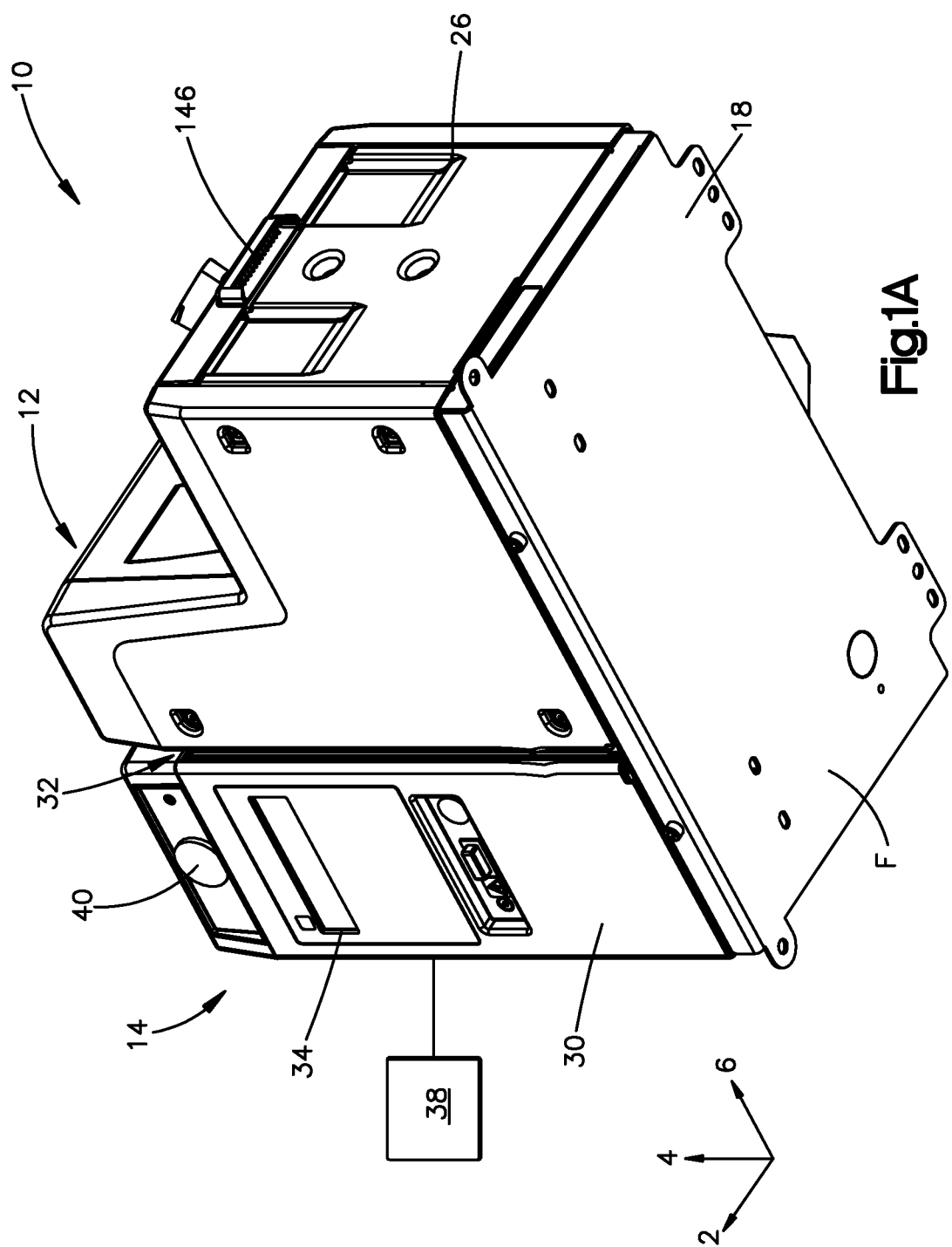

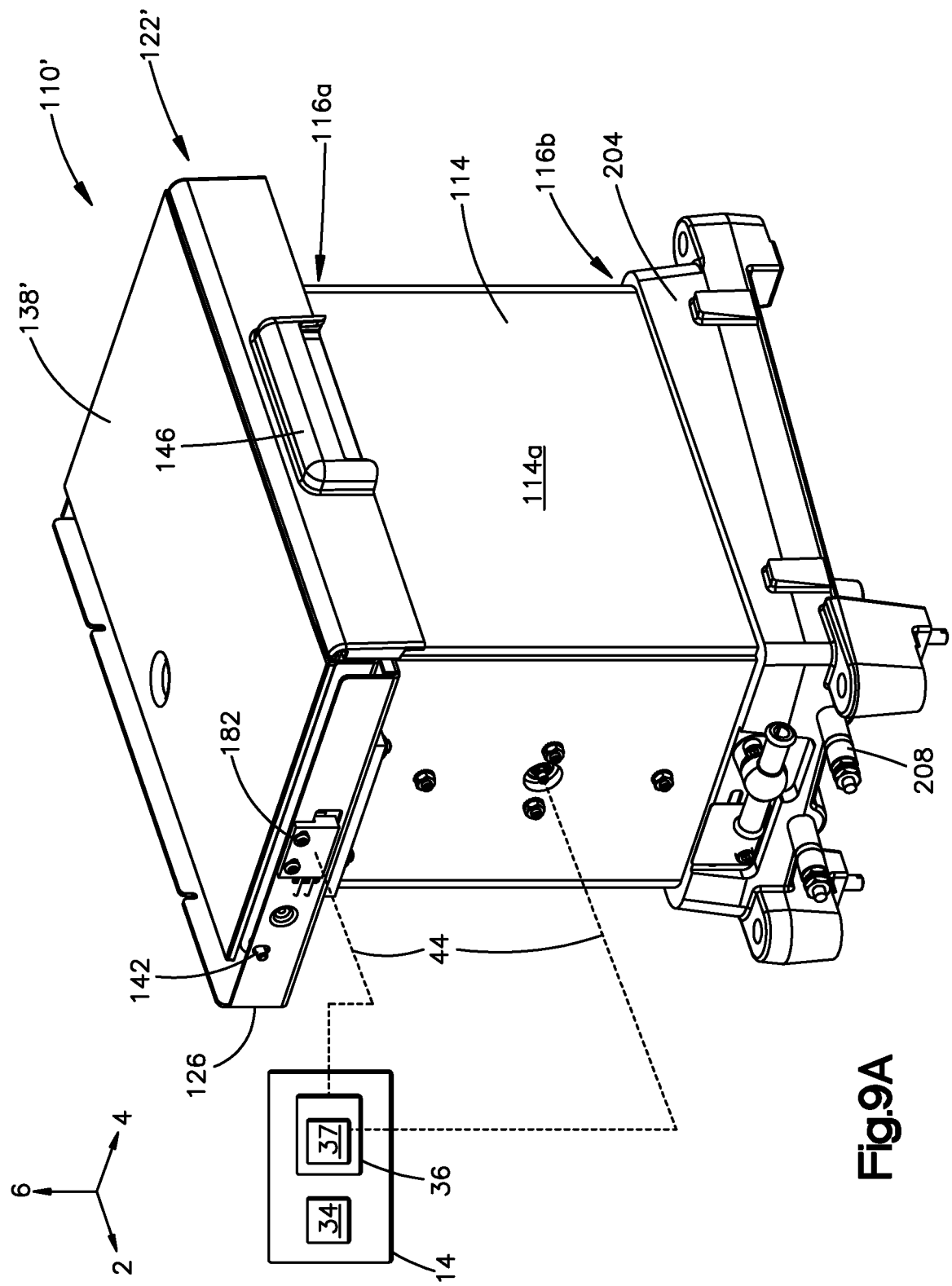

MELTER WITH SELF-CLEANING FILTER

CROSS-REFERENCE TO RELATED APPLICATIONS

This application is a National Stage Application of International Patent Application No. PCT/US2020/051226, filed Sep. 17, 2020, which claims the benefit of U.S. provisional patent application no. 62/903,383, filed on Sep. 20, 2019, the disclosures of all of which are hereby incorporated by reference as if set forth in its entirety herein.

TECHNICAL FIELD

The present disclosure generally relates to melters of adhesive dispensing devices, and, more particularly to lid assemblies with self-cleaning filters of melters.

BACKGROUND

In adhesive melting and dispensing operations, filters are required to prevent vapors from exiting a melting area and transferring harmful particulates to the surrounding environment. Such filters must typically be periodically cleaned and/or changed, which can lead to costly downtime in melting operations in terms of labor and materials. Additionally, melters used to receive and melt solid adhesive can include lid assemblies that are capable of opening to allow an operator to manually fill a receiving space of the melter. However, variability in the open time and frequency of the lid assembly can have adverse effects on a melting operation, such as through allowing gas from the receiving space to escape to the surrounding environment, or unpredictability in temperatures within the receiving space.

As a result, there is a need for a filter that is self-cleaning to avoid previously required cleanings and replacement, as well as a method for tracking characteristics related to the opening and closing of a melter lid assembly.

SUMMARY

In one example, a melter comprises a housing, a heater, a vent, and a filter medium. The housing defines a receiving space configured to support adhesive therein. The heater is configured to heat the receiving space of the housing to melt the adhesive. The melter defines an adhesive inlet therein that is configured to receive adhesive carried by a transport supply gas into the receiving space. The vent extends through a wall of the melter and is configured to permit the transport supply gas to escape from the melter. The filter medium is supported in the vent, is configured to capture particulates from the transport supply gas escaping the receiving space, and is positioned relative to the receiving space such that heat from the receiving space causes the particulates captured by the filter medium to melt and fall into the receiving space.

Another example of the present disclosure is method of operating a melter comprising a lid assembly attached to a housing, the housing defining a receiving space configured to receive adhesive. The method includes detecting opening of the lid assembly at a first time and detecting closing of the lid assembly at a second time that is after the first time. The method also includes defining, via a controller, opening and closing of the lid assembly as a lid event, and storing the lid event, via the controller, in an array of lid events.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

FIG. 1A illustrates a perspective view of an adhesive dispensing device according to an example of the present disclosure;

FIG. 9A illustrates a perspective view of a melter according to another example of the present disclosure;

DETAILED DESCRIPTION

Figure 1B:
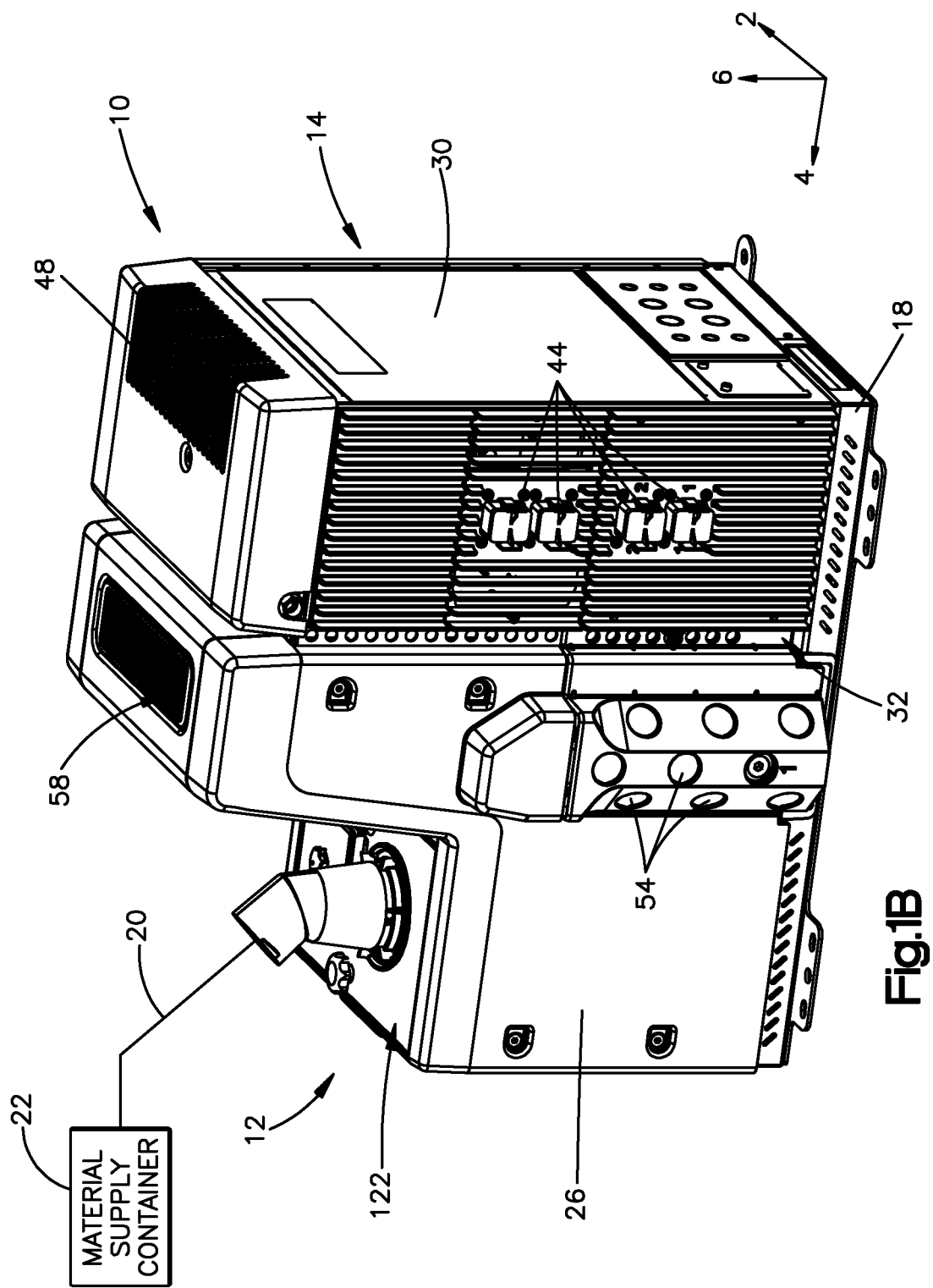
FIG. 1B illustrates an alternative perspective view of the adhesive dispensing device shown in FIG. 1A.

Described herein are melters 110, 110' for receiving and melting adhesive. Certain terminology is used to describe the melters 110, 110' in the following description for convenience only and is not limiting. The words "right", "left", "lower," and "upper" designate directions in the drawings to which reference is made. The words "inner" and "outer" refer to directions toward and away from, respectively, the geometric center of the description to describe the melters 110, 110' and related parts thereof. The words "forward" and "rearward" refer to directions in a longitudinal direction 2 and a direction opposite the longitudinal direction 2 along the melters 110, 110' and related parts thereof. The terminology includes the above-listed words, derivatives thereof and words of similar import.

Unless otherwise specified herein, the terms "longitudinal," "vertical," and "lateral" are used to describe the orthogonal directional components of various components of the melters 110, 110' as designated by the longitudinal direction 2, lateral direction 4, and vertical direction 6. It should be appreciated that while the longitudinal and lateral directions 2, 4 are illustrated as extending along a horizontal plane, and the vertical direction 6 is illustrated as extending along a vertical plane, the planes that encompass the various directions may differ during use.

Referring to FIGS. 1A and 1B, a modular adhesive dispensing device 10 in accordance with one example of the invention is shown. The adhesive dispensing device 10 includes a melt module 12 and a control module 14 electrically and/or physically coupled to the melt module 12. The melt module 12 is configured to include the components related to receiving solid adhesive and melting the solid adhesive, whereas the control module 14 is configured to include the electronic components for controlling operation of the melt module 12, where each of the melt module 12 and the control module 14 will be described in detail further below. Each of the melt module 12 and the control module 14 can be mounted to and supported by a base 18. The base 18 can comprise a metal body and is configured to releasably couple to each of the melt module 12 and the control module 14, such as through fasteners that can comprise bolts, screws, etc., though it is contemplated that the melt module 12 and the control module 14 can be alternatively coupled to the base 18 in other examples. The adhesive dispensing device 10 is modular in nature, and as such either or both of the melt module 12 and control module 14 can be detached from the adhesive dispensing device 10 and replaced with alternatively configured melt modules and control modules, as will be described further below.

When the melt module 12 and the control module 14 are coupled to the base 18, a thermal gap 32 can be defined between the melt module 12 and the control module 14. The thermal gap 32 can be configured to minimize and/or substantially eliminate heat transfer from the melt module 12 to the control module 14 so as to prevent damage to the electronic components contained by the control module 14 caused by the heat created by the melt module 12. The thermal gap 32 can comprise a space between the melt module 12 and the control module 14. Additionally, it is contemplated that the thermal gap 32 can further include materials configured to prevent heat transfer, such as various types of insulation, though any specific type of material or structure is not required.

As shown in FIG. 1A, the adhesive dispensing device 10 can define a specific footprint F. The lower end of the base 18 can define the footprint F, which can be defined as a cross-sectional shape and area defined by the lower end of the base 18. The footprint F can also, additionally or alternatively, be defined by the collective lower ends of the melt module 12 and the control module 14. The adhesive dispensing device 10 can be modular, such that either or both of the melt module 12 and control module 14 can be detached from the adhesive dispensing device 10 and replaced without affecting the size and or shape of the footprint F of the adhesive dispensing device 10. This can be highly beneficial to an operator of the adhesive dispensing device 10, as the adhesive dispensing device 10 can remain in place while the adhesive dispensing device 10 is reconfigured to replace certain components, potentially in preparation for a new adhesive melting and dispensing operation. Additionally, when setting up an adhesive processing area, the operator only needs to accommodate one shape and size of adhesive dispensing device.

Continuing with FIGS. 1A-3, the adhesive dispensing device 10 can include a melt module cover 26 and a control module cover 30 configured to provide selective access to the melt module 12 and the control module 14, respectively. The melt module cover 26 is configured to house the components of the melt module 12 and at least partially insulate the melt module 12 from the surrounding environment, while the control module cover 30 is configured to house the components of the control module 14, as well as insulate the control module 14 from the melt module 12 and the surrounding environment. The previously-described thermal gap 32 can be specifically defined between the melt module cover 26 and the control module cover 30. The melt module cover 26 can define a vent 58 that can be used to avoid overheating the components of the melt module 12 held within the melt module cover 26. Similarly, the control module cover 30 can define a vent 48 that can be used to avoid overheating the components of the control module 14 held within the control module cover 30. Though one example and arrangement of vents 48, 58 is shown, the adhesive dispensing device 10 can include other examples of the vents 48, 58, as well as more vents not depicted or described herein.

The melt module cover 26 substantially encloses a melter 110 configured to receive and melt solid adhesive. A lid assembly 122 can be attached at the upper end of the melter 110. The lid assembly 122 can be configured to allow selective access to the interior of the melter 110, as well as protect the operator from the heat and associated fumes produced by the melter 110. The lid assembly 122 can include a handle 146 so as to be manually opened by the operator, though it is contemplated that the melt module 12 can include a mechanism for automatically opening the lid assembly 122. In the depicted example, the lid assembly 122 (or other components of the melt module 12) can include a passage for automatically loading the melt module 12 with solid adhesive from a solid adhesive source spaced from the adhesive dispensing device 10. The lid assembly 122 allows the operator to manually open the lid assembly 122 so as to manually load the melt module 12 with solid adhesive as desired. As shown in FIG. 1B, the melt module 12 can also include a plurality of outputs 54 that are each configured to be in fluid communication with an application device (not shown) so as to convey melted adhesive from the melt module 12 to one or more application devices. As shown, when not connected to an application device, each of the plurality of outputs 54 can be sealed using a plug. Any number or combination of the outputs 54 can be connected to an application device at any instant according to the particular melting and dispensing operation being performed.

Figure 2A:
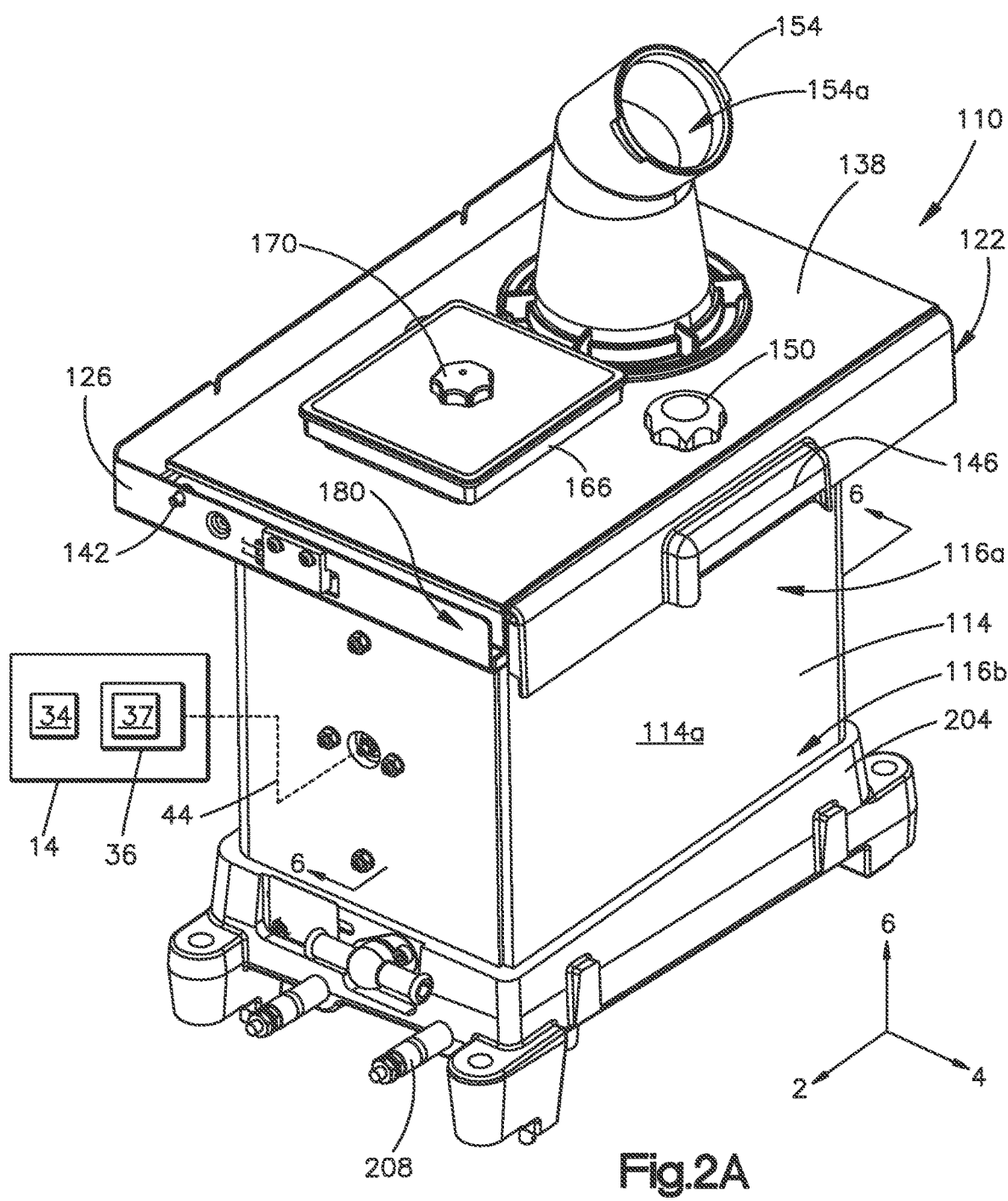
FIG. 2A illustrates a perspective view of a melter of the adhesive dispensing device shown in FIG. 1A.
Figure 2B:
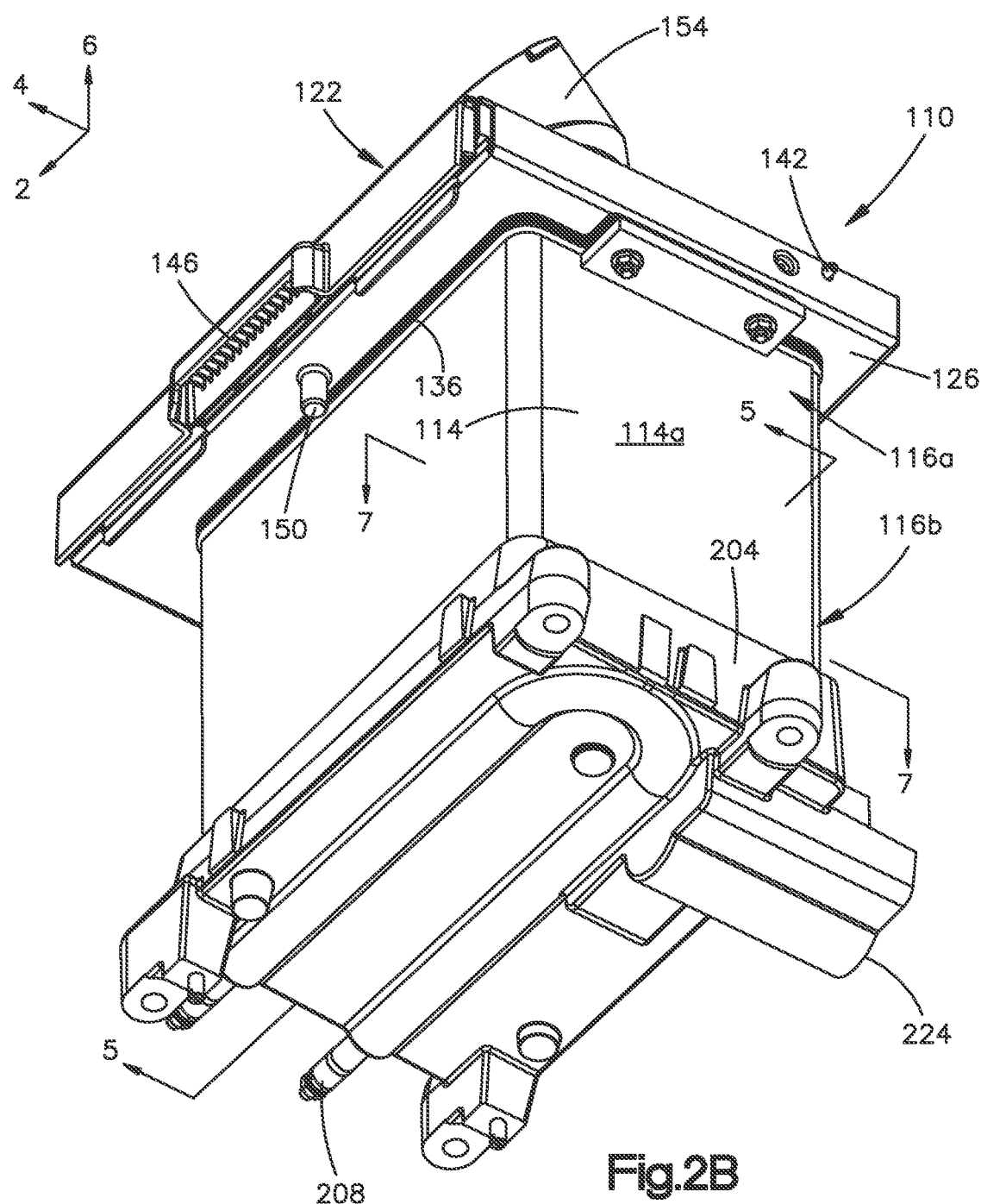
FIG. 2B illustrates an alternative perspective view of the melter shown in FIG. 2A.
Figure 3:
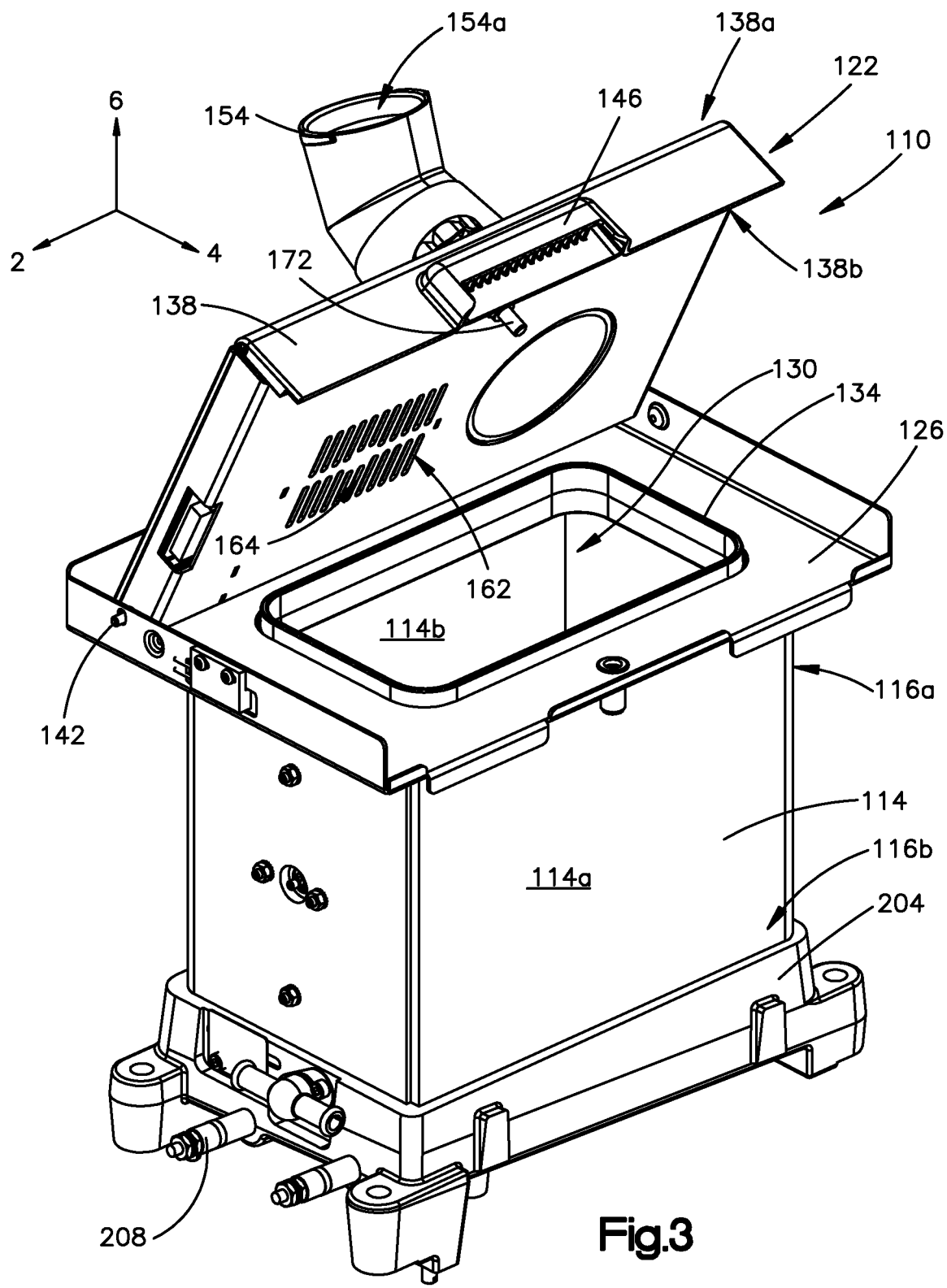
FIG. 3 illustrates a perspective view of the melter shown in FIG. 2A, with the lid assembly in an open position.

The control module 14 can include a controller 36 (labeled in FIG. 2A). The controller 36 can comprise any suitable computing device configured to host a software application for monitoring and controlling various operations of the adhesive dispensing device 10 as described herein. It will be understood that the controller 36 can include any appropriate integrated circuit. Specifically, the controller 36 can include a memory 37 and be in signal communication with a human-machine interface (HMI) device 34. The memory 37 can be volatile (such as some types of RAM), non-volatile (such as ROM, flash memory, etc.), or a combination thereof. The controller 36 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 36. The memory of the controller 36 can be configured to store and recall on demand various metering operations to be performed by the adhesive dispensing device 10. The control module 14 can further include electrical connections extending through the control module cover 30, which can be configured to connect with a power source, external computing devices, etc., so as to transmit power and/or signals to and from the adhesive dispensing device 10. The controller 36 can be in signal communication with a switch 180 and a level sensor 200, as will be described further below.

As noted above, the control module 14 can include an HMI device 34 in signal communication with the controller 36. In the depicted example, the HMI device 34 can include a display, such as an OLED screen. However, it is contemplated that the HMI device 34 can also include, in addition or alternatively, various types of inputs that provide the ability to control the controller 36, via, for example, buttons, soft keys, a mouse, voice actuated controls, a touch screen, movement of the controller 36, visual cues (e.g., moving a hand in front of a camera on the controller 36), or the like. The HMI device 34 can provide outputs via a graphical user interface, including visual information, such as the visual indication of the current conditions within the adhesive dispensing device 10, as well as acceptable ranges for these parameters via a display. Other outputs can include audio information (e.g., via speaker), mechanically (e.g., via a vibrating mechanism), or a combination thereof. In various configurations, the HMI device 34 can include a display, a touch screen, a keyboard, a mouse, a motion detector, a speaker, a microphone, a camera, or any combination thereof. The HMI device 34 can further include any suitable device for inputting biometric information, such as, for example, fingerprint information, retinal information, voice information, and/or facial characteristic information, for instance, so as to require specific biometric information for accessing the controller 36. In addition to the HMI device 34, the control module 14 can include a pressure dial 40 for easily displaying pressure readings of the adhesive at certain locations within the adhesive dispensing device 10.

Additionally, the controller 36 can be in signal communication with a remote device 38 (labeled in FIG. 1A) spaced from the control module 14. In one example, the remote device 38 can comprise a display spaced from the control module 14, such as an OLED display, though various types of conventional displays are contemplated. Alternatively, the remote device 38 can comprise an external computing device, examples of which include a processor, a desktop computing device, a server computing device, or a portable computing device, such as a laptop, panel PC, tablet, or smart phone. Accordingly, the remote device 38 can provide the operator with the ability to interact with and control the controller 36 at a distance from the adhesive dispensing device 10.

Continuing with FIGS. 1A-8, the melt module 12 will be described in greater detail. As stated above, the melt module 12 comprises a melter 110 that can include a plurality of components that are configured to receive pellets of adhesive material. For example, the melter 110 can comprise a lid assembly 122 that is configured to be opened to receive pellets of adhesive material into the melter 110. Additionally, or alternatively, the melter 110 can define an adhesive inlet that extends through a wall of the melter 110 and that is configured to couple to a material supply conduit 20 such as a pipe or hose (not shown) to receive pellets of adhesive material into the melter 110 from an adhesive storage container 22 that is separate and spaced from the melter 110. The adhesive inlet can extend through the lid assembly 122 or any other suitable wall of the melter 110. The adhesive storage container 22 can be configured to supply a pressurized transport supply gas to the melter 110 via the supply conduit 20 such that the transport supply gas carries the adhesive material into the melter 110. In one example, the adhesive inlet can include an input pipe 154 that receives the pellets of adhesive material. The adhesive inlet input pipe 154 can optionally connect to the lid assembly 122. The melter 110 is configured to heat and melt those pellets into molten adhesive at an elevated application temperature. The melt module 12 can also include a pump (not shown) configured to pressurize and dispense the molten adhesive through the outputs 54 to downstream application devices, such as guns or modules (not shown).

As the transport supply gas carries the adhesive material into the melter 110, the transport supply gas can build up within the melter 110. Therefore, the melter 110 can be equipped with a vent 164 (labeled in FIG. 3) that extends through a wall of the melter 110 and that is configured to permit the transport supply gas to escape from the melter 110. The vent 164 can extend through any suitable wall of the melter 110, preferably above an adhesive fill line of the melter 110. In one example, the vent 164 can extend through the lid assembly 122 as will be described in further detail below. However, the vent 164 can extend through another suitable wall of the melter 110.

Commonly, the pellets of adhesive material that are stored in the adhesive storage container 22 are mixed with a powder that that prevents the pellets from sticking together. Further, the pellets of adhesive material can be mixed with smaller particles of adhesive, sometimes referred to as fines, which are broken pieces of the pellets or other small pieces resulting from the pelletizing process. This particulate (e.g., powder and/or smaller pieces of adhesive) can be carried by the transport supply gas out of the vent 164 and into the environment outside of the melter 110, potentially exposing workers to these smaller particles. To prevent such exposure, the melter 110 can be implemented with a filter having a filter medium 174 (labeled in FIG. 4) that is configured to filter and capture particulates, such as the powder and/or smaller pieces of pellets, from escaping the melter 110 with the transport supply gas. The filter medium 174 can be any suitable filter medium for capturing particulates such as powder and/or smaller pieces of pellets from escaping the melter 110. In one example, the filter medium 174 can comprise a mesh.

The melter 110 can include a housing 114 that has an outer surface 114a and an inner surface 114b opposite the outer surface 114a. The housing 114 can have at least one sidewall that defines a receiving space 118 of the housing 114. For example, the housing 114 can be defined by four sidewalls such that the housing defines a substantially rectangular shape, though other shapes for the housing 114 are contemplated. The inner surface 114b of the housing 114 defines the receiving space 118 configured to receive adhesive. The housing 114 can also define an upper end 116a and a lower end 116b opposite the upper end 116a along the vertical direction 6. The housing 114 can define a laterally-extending top wall 117 (labeled in FIG. 5) at its upper end 116a that at least partially covers the upper end 116a, while the lower end 116b can include a base 204. The base 204 can be a separate but integral component to the housing 114, though it is contemplated that the base 204 and housing 114 can be monolithic. A heater 208 can be contained within the base 204, where the heater 208 is configured to heat the housing 114 and base 204 so as to heat and melt the adhesive within the receiving space 118. The heater 208 can be any conventional type of heater capable of being used in adhesive melting applications.

To further aid in heating and melting of the adhesive, the base 204 can include one or more fins 212 extending upwards into the receiving space 118 along the vertical direction 6. The fins 212 are configured to be heated by the heater 208 in the base 204, and can provide an increase in heated surface area in contact with the adhesive, thus enabling increased heat transfer to and melting of the adhesive. Though one particular configuration and arrangement of fins 212 is shown, other fin configurations and arrangements are contemplated. Once the adhesive is melted, it can flow through an outlet 216 (labeled in FIG. 7) defined in the base 204 and to an outlet connector 224 (labeled in FIG. 5) that connects the outlet 216 to a pump (not shown) disposed within the melt module 12. As stated previously, the pump is configured to pump the melted adhesive through the outputs 54 and to downstream application devices. A cage 220 can be positioned within the receiving space 118 and around the outlet 216. The cage 220 can be configured to prevent unmelted adhesive pieces from flowing to the outlet 216 and potentially congealing around and partially or completely blocking the outlet 216.

The melter 110 can also include a level sensor 200 (labeled in FIGS. 5 and 6) attached to the inner surface 114b of the housing 114. The level sensor 200 can be a capacitive level sensor, though other types of level sensors are contemplated. The level sensor 200 can be connected to the controller 36 through a signal connection 44, where the signal connection 44 can be wired and/or wireless. In operation, the level sensor 200 can detect the adhesive level within the receiving space 118 and, intermittently or constantly, transmit a signal indicative of the adhesive level within the receiving space 118 to the controller 36 through the signal connection 44. In addition to the level sensor 200, the melter 110 can also include a temperature sensor 202 configured to detect a temperature within the receiving space 118, as will be described further below. The temperature sensor 202 can also be connected to the controller 36 through a signal connection 44, where the signal connection 44 can be wired and/or wireless.

Continuing with FIGS. 2A-6, one example of the lid assembly 122 of the melter 110 will be described in greater detail. The lid assembly 122 is attached to the upper end 116a of the housing 114. The lid assembly 122 can include a cover plate 126 defining an opening 130 that extends through the cover plate 126 and is in fluid communication with the receiving space 118. Though defining a particular shape and size, it is contemplated that the opening can define other shapes and sizes as desired. A gasket 134 (labeled in FIG. 3) can be attached to the cover plate 126 around the perimeter of 130, where the gasket 134 is configured to form a seal with the lid body 138, which will be described further below, when the lid body 138 is in a closed position. By forming a seal with the lid body 138, the gasket 134 can prevent heat and/or fumes from escaping the receiving space 118 through the lid assembly 122. The lid assembly 122 can also include a gasket 136 (labeled in FIG. 5) positioned at the outer edge of the interface between the cover plate 126 and the top wall 117 of the housing 114. Similar to the gasket 134, the gasket 136 can be configured to form a seal between the cover plate 126 and the top wall 117 to prevent heat and/or fumes from escaping the receiving space 118.

The lid assembly 122 can include a movable lid body 138. The lid body 138 can be attached to the cover plate 126, and likewise the housing 114. The lid body 138 can define an upper end 138a, and a lower end 138b opposite the upper end along the vertical direction 6. The upper end 138a can be formed of a thermally isolating material that can be relatively cool to the touch so as to limit the likelihood that a worker could burn themselves on the lid assembly 122. The lower end 138b can be formed of a thermally conductive material such as a metal. The lid assembly 122 can include a hinge that is configured to pivot the movable lid body 138 relative to the housing 114. In one example, the hinge can include a rod 142 (labeled in FIGS. 3 and 4) that can be attached to the lid body 138, where the rod 142 is also configured to attach to the cover plate 126. The rod 142 can be configured to allow the lid body 138 to rotate relative to the cover plate 126 between a closed position, in which the lid body 138 covers and prevents manual access to the receiving space 118 through the opening 130, and an open position, in which the lid body 138 permits manual access to the receiving space 118 through the opening 130. The lid body 138 can be configured to rotate about an axis that is substantially perpendicular to the vertical direction 6 and extends in the longitudinal direction 2, though other orientations of the axis are contemplated. Additionally, though a rod 142 is shown as providing the pivot between the lid body 138 and the cover plate 126, it is contemplated that other devices can be utilized, such as various hinges, etc. A handle 146 (labeled in FIG. 1A) can be attached to the lid body 138 to allow an operator to manually transition the lid body 138 between the open and closed positions. However, it is also contemplated that in other examples, the lid assembly 122 can include devices that automatically transition the lid body 138 between the open and closed positions. The lid assembly 122 can include a fastener 150 (labeled in FIG. 2A) that extends through the lid body 138 and is configured to releasably engage the cover plate 126 to selectively lock the lid body 138 in the closed position. Though a fastener 150 is specifically used to lock the lid body 138 in the closed position, in other examples it is contemplated that other features can be utilized to accomplish this, such as latches, magnetic locks, etc.

The lid assembly 122 can further include an adhesive inlet. In one example, the adhesive inlet can include an input pipe 154 connected to and extending from the upper end 138a of the lid body 138. The input pipe 154 can be define an input channel 154a extending therethrough, where the input channel 154a further extends through the lid body 138 and is in fluid communication with the receiving space 118 defined by the housing 114. In operation, the input pipe 154 can be connected to a supply of solid adhesive particulate (not shown). The supply of solid adhesive particulate can be supplied to the input pipe 154 by a suitable supply conduit 20 (labeled in FIG. 1B) such as a hose. The solid adhesive can be provided to the receiving space 118 through the adhesive inlet, such as the input channel 154a, from the supply of solid adhesive. This can be done at discrete increments, upon instruction by the operator, or as needed based upon level readings by the level sensor 200, as will be described further below. It will be understood that, in alternative examples, the lid assembly 122 can be devoid of the input pipe 154, and the supply conduit be connected to the adhesive inlet without using an input pipe 154.

Figure 4:
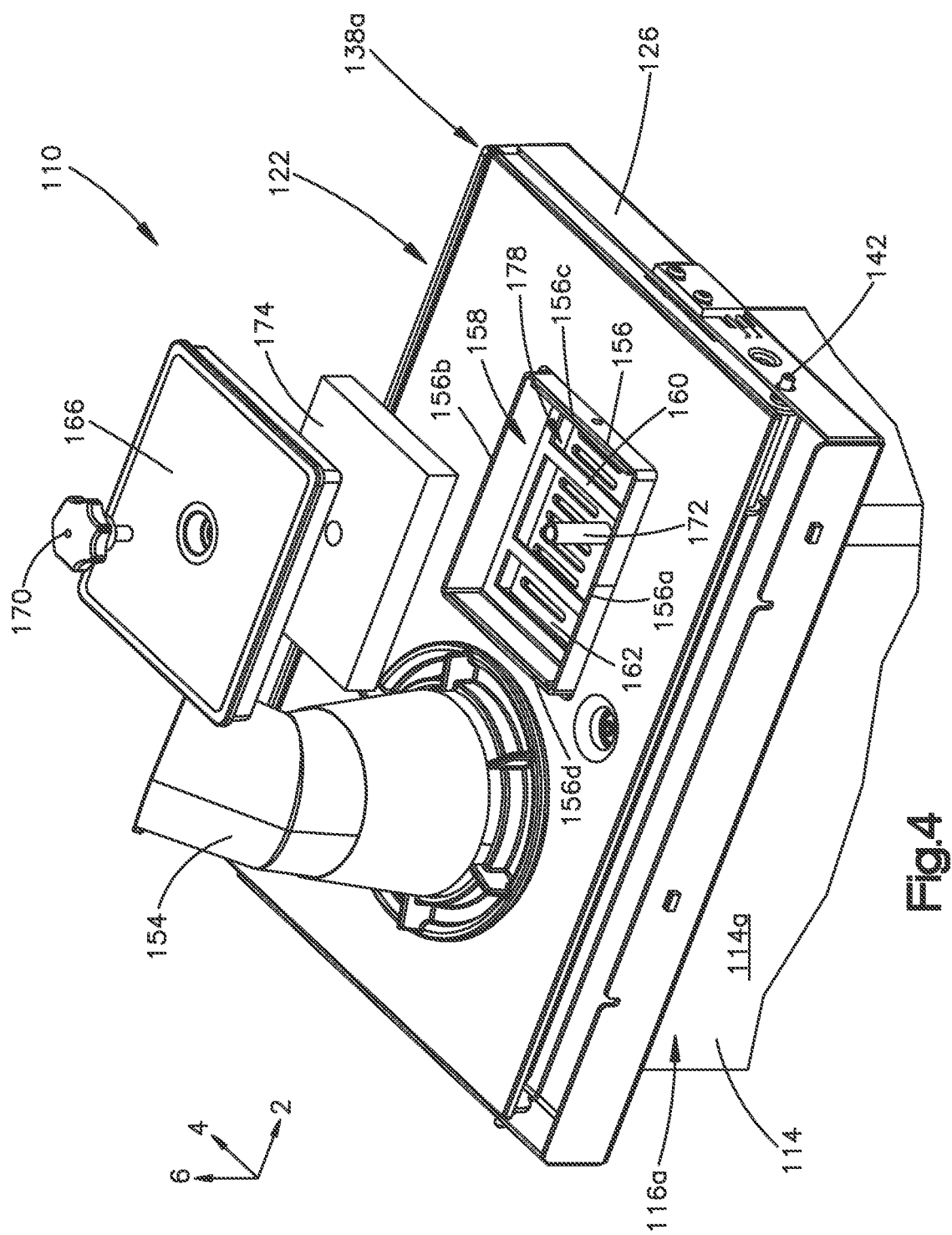
FIG. 4 illustrates a perspective view of the lid assembly of the melter shown in FIG. 2A.
Figure 5:
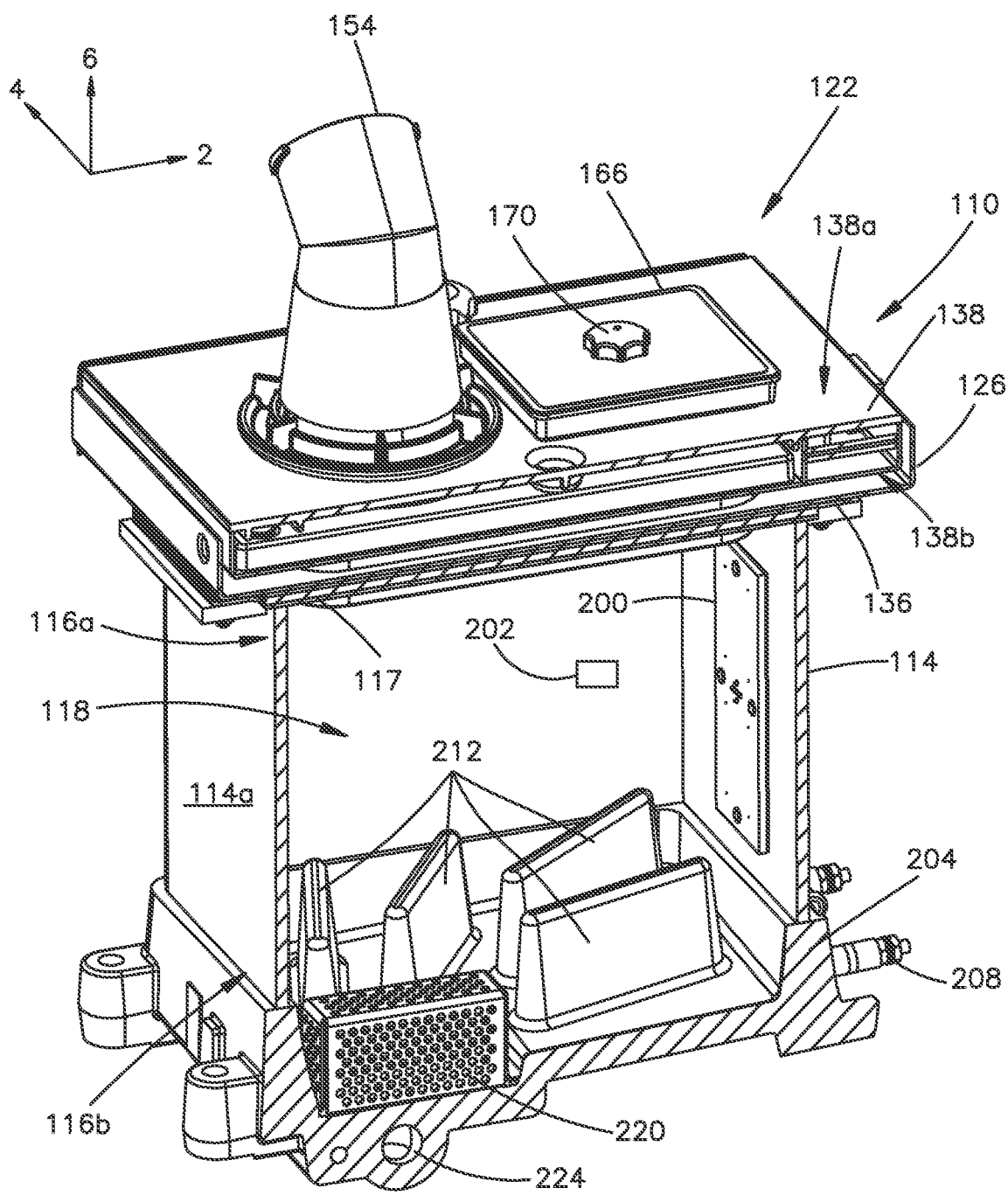
FIG. 5 illustrates a side cross-sectional view of the melter shown in FIG. 2A, taken along line 5-5 shown in FIG. 2B.
Figure 6:
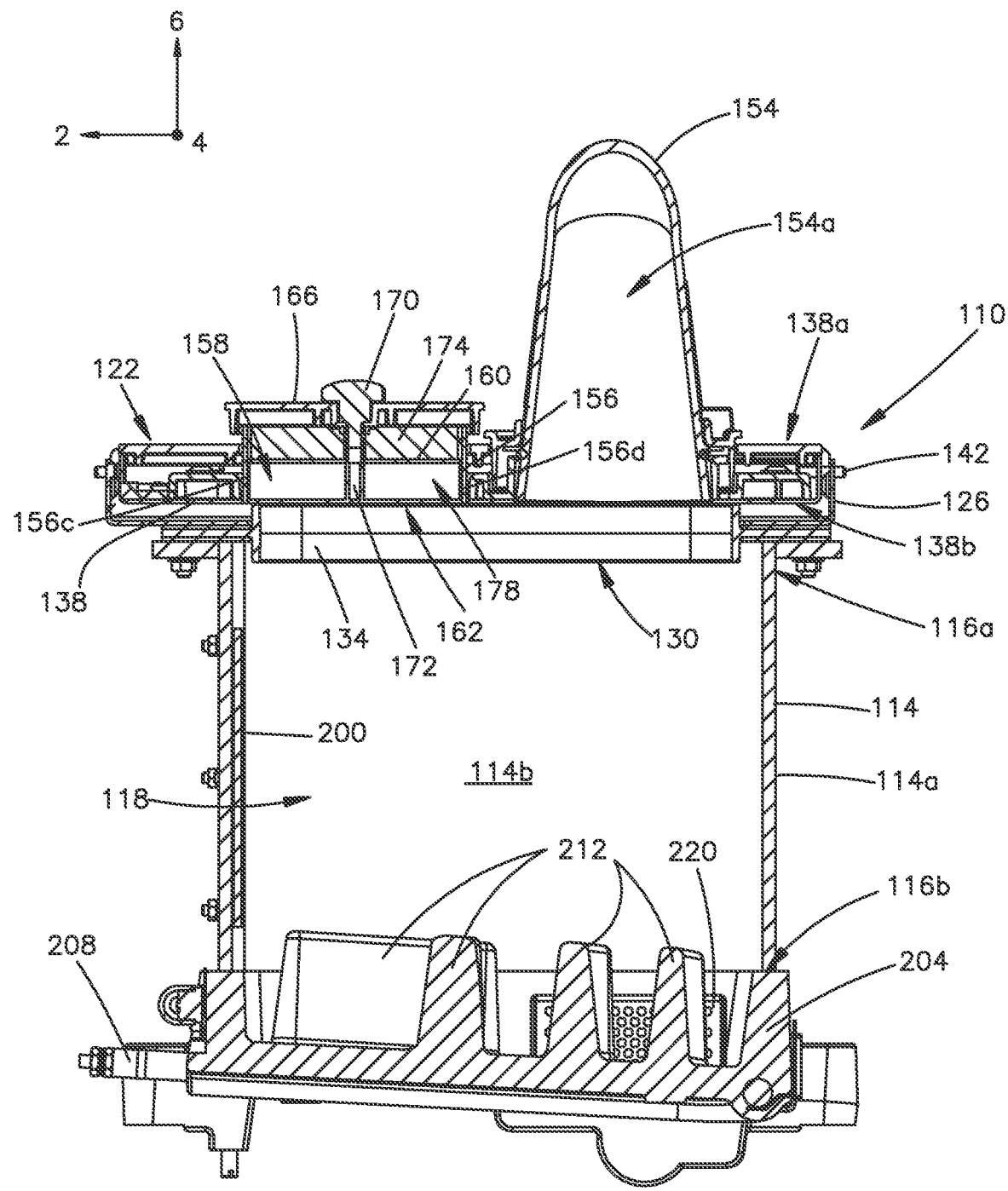
FIG. 6 illustrates a side cross-sectional view of the melter shown in FIG. 2A, taken along line 6-6 shown in FIG. 2A.
Figure 7:
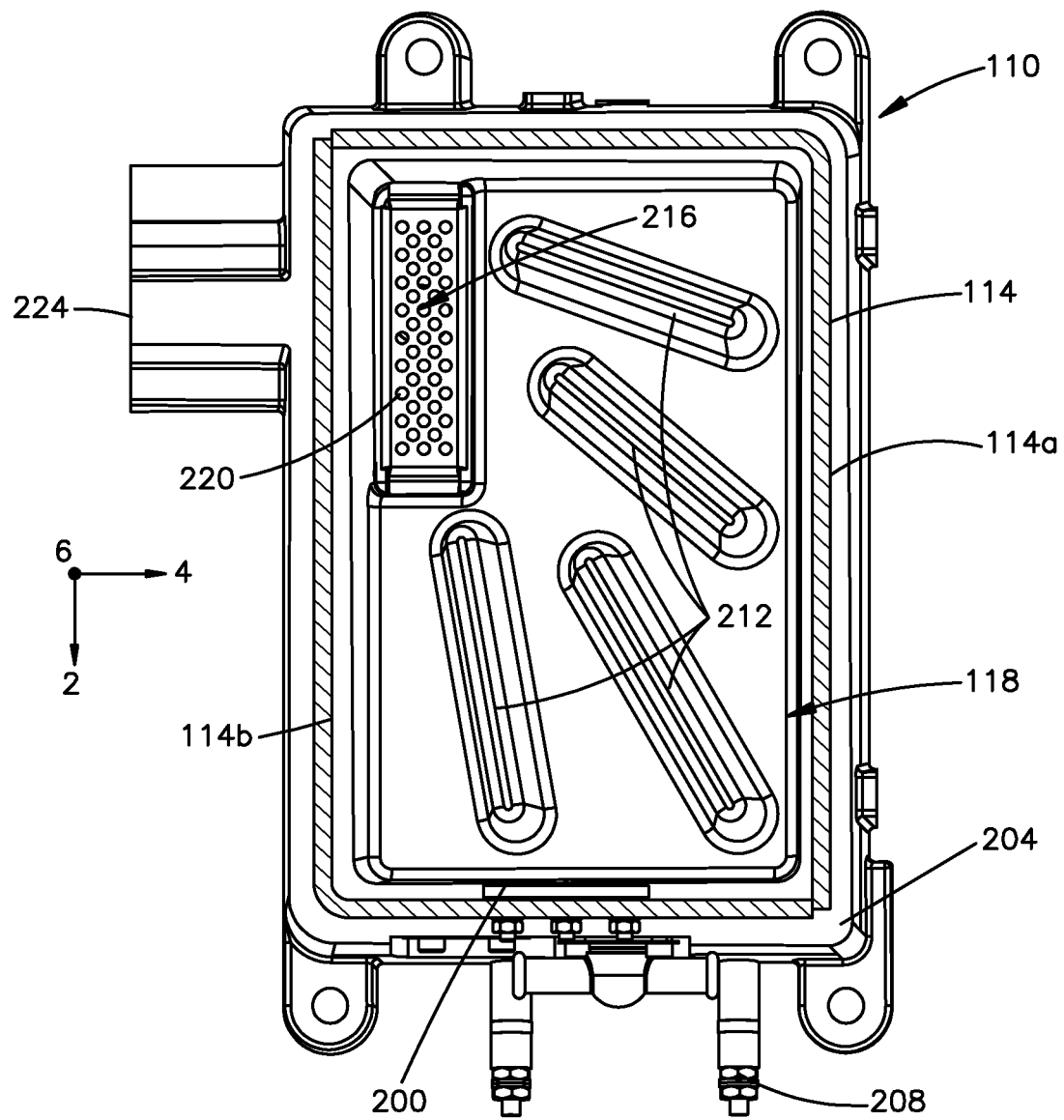
FIG. 7 illustrates a top cross-sectional view of the melter shown in FIG. 2A, taken along line 7-7 shown in FIG. 2B.

Referring to FIGS. 4 and 6, the lid body 138 can be configured to support the filter medium 174 that is configured to filter and capture particulates escaping the receiving space 118 from air escaping the melter 110. The lid body 138 can define a filter housing 156 therein that is configured to receive the filter medium 174. Specifically, the filter housing 156 can define a filter chamber 158 that extends into the lid body 138 between the upper end 138a of the lid body 138 to the lower end 138b, such as from the upper end 138a towards the lower end 138b. The filter housing 156 is configured to receive and support the filter medium 174 therein. The filter housing 156 can have a first side 156a, a second side 156b opposite the first side 156a along the lateral direction 4, a third side 156c that extends from the first side 156a to the second side 156b, and a fourth side 156d opposite the third side 156c that also extends from the first side 156a to the second side 156b. As such, the filter chamber 158 (and subsequently the filter medium 174) can have a substantially rectangular shape, though it is contemplated that the filter chamber 158 and the filter medium 174 can have other shapes in other examples.

The lid body 138 can include a filter support 160 configured to support the filter medium 174 when the filter medium 174 is disposed within the filter chamber 158. The filter support 160 can at least partially extend into the filter chamber 158. In the depicted example, the filter support 160 comprises a plurality of metal bars extending through the filter chamber 158 along the longitudinal and lateral directions 2, 4. However, it is contemplated that the filter support 160 can be alternatively configured. The lower end 138b of the lid body 138 can define a grate 162 that is open to the filter chamber 158 and can define the lower end of the filter chamber 158. The grate 162 can be defined by a plurality of slots extending through the lower end 138b of the lid body 138, and is configured to prevent large particles of adhesive from reaching and potentially interfering with the effectiveness of the filter medium 174. The grate 162 can be spaced from the filter support 160 along the vertical direction 6, such that a gap 178 is defined between the filter support 160 and the grate 162. By creating this gap 178, a higher percentage of the bottom surface area of the filter medium 174 is open to the filter chamber 158 and likewise available for filtering adhesive particulates from the air.

The lid assembly 122 can include a cover 166 configured to releasably attach to the upper end 138a of the lid body 138 to secure the filter medium 174 within the filter chamber 158. In the depicted example, a sleeve 172 comprising a threaded passage can extend upwards through the filter chamber 158 from the lower end 138b of the filter chamber 158 and through the filter medium 174, where the sleeve 172 is configured to engage a fastener 170. The fastener 170 can extend downwards through the cover 166, such that when the fastener 170 engages the sleeve 172, the fastener 170 secures the cover 166 to the lid body 138. In the depicted example, the fastener 170 includes a head capable of being manually rotated by an operator of the adhesive dispensing device 10 such that the cover 166 can be detached. However, it is also contemplated that the fastener 170 can define a keyed head that requires a tool for detachment. Additionally, though a fastener 170 is specifically described, it is contemplated that alternative mechanisms can be utilized to secure the cover 166 to the lid body 138, such as snap-fit engagement, a latch, etc. When the cover 166 is detached from the lid assembly 122, the filter medium 174 is configured to be removed from the receiving space 118 for cleaning or for replacement of the filter medium 174, or alternatively for cleaning or maintenance of the receiving space 118.

The placement of the filter medium 174 relative to the receiving space 118 allows the filter medium 174 to be self-cleaning. In conventional melter assemblies, the filter is capable of filtering adhesive particulates from air escaping the receiving space. However, this filtered adhesive particulate remained adhered to the filter. As a result, over time the filter loses its filtering effectiveness, thus requiring shutdown of the melter assembly for filter cleaning or replacement. In the melter 110 of the present disclosure, on the other hand, the filter medium 174 is placed in close proximity to the components of the melter 110 heated by the heater 208, such as the housing 114, the fins 212, and ultimately the adhesive. As a result, the filter medium 174 is also heated sufficiently to cause adhesive particulates captured by the filter medium 174 to melt. The particulates within the filter medium 174 can be heated by (i) convection from heated gases within the receiving space 118 of the housing, (ii) radiation from the hot melt adhesive, (iii) conduction from metal surfaces of the melter 110, or (iv) any combination of two or more of these modes of heating. The melted particulates can then fall through the grate 162 and into the receiving space 118 of the housing 114. By melting particulates captured by the filter medium 174 such that these particulates do not remain attached to the filter medium 174, the filter medium 174 does not require the frequent cleanings and/or replacement of previous filters, thus leading to fewer downtimes for the melter 110 and lower costs related to downtimes and replacement filters.

Although one example is illustrated in which the vent 164 and filter medium 174 are positioned on the lid body 138, examples of the disclosure are not so limited. It will be understood that, in alternative examples, the vent 164 and filter medium 174 can be disposed at another position on the melter 110 that is in close enough proximity to the hot components and/or contents of the melter 110 to cause particulates, such as powder or smaller pieces of pellets, on the filter medium 174 to melt and fall from the filter medium 174. For example, the vent 164 can extend through at least one sidewall of the melter housing 114 and the filter medium 174 can be supported by the sidewall over the vent 164. Preferably, the vent extends through a wall of the melter 110 at a position that is above the adhesive fill line of the melter 110.

In some examples, the filter medium 174 can be positioned at a distance that is within a range of 0.0 inches to 3.0 inches from the receiving space 118 of the housing 114, such as within a range of 0.0 inches to 2.0 inches from the receiving space 118, such as within a range of 0.0 inches to 1.0 inches from the receiving space 188. The distance can be measured from an inner surface of the filter medium 174 to an inner surface that defines the receiving space 188, such as an inner surface of the lid body 138, an inner surface of the cover plate 126, or an inner surface of a sidewall of the housing 114. The positioning the filter medium 174 closer to the receiving space 188 can result in better melting of the particulate captured by the filter medium 174.

In preferred examples, the filter medium 174 is positioned relative to the receiving space 118 such that, when the particulates captured by the filter medium 174 are heated and melted, the particulates fall into the receiving space 118 of the housing 114, and consequently into the hot melt adhesive within the receiving space 118. The filter medium 174 can be supported relative to the receiving space 118 such that there is at least one unobstructed, straight path, such as a plurality of unobstructed, straight paths, from the filter medium 174 to the receiving space 118. For example, in the example shown, the filter medium 174 is vertically aligned with the opening 130 in the cover plate 126. Thus, melted particulate can fall from the filter medium 174 directly into the receiving space 118 without being obstructed by another component of the melter 110. As discussed above, the melter 110 can include a grate 162 below the filter medium 174. In such an example, a plurality of unobstructed, straight paths can extend from the filter medium 174, through the holes of the grate 162, and to the receiving space 118.

The filter medium 174 can have a first surface that faces towards the receiving space 118, and a second surface opposite the first surface. The first surface can have a length along one of the longitudinal direction 2 and the lateral direction 4, and a width along another of the longitudinal direction 2 and the lateral direction 4. The filter medium 174 can have a height along the vertical direction 6 from the first surface to the second surface. One or both of the width and length can be greater than the height. The first surface can have a cross-sectional area that is greater than a cross-sectional area of the filter medium 174 in a plane (e.g., a vertical plane) that is perpendicular to the first surface. Thus, the first surface can be considered to be a broadside of the filter medium 174, and the filter can have a relatively thin profile from the first surface to the second surface. Orienting the filter medium 174 in such a manner can ensure that the filter medium 174 heats from the first surface to the second surface, and that any particulate captured in the filter medium 174 has a short distance to travel out of the filter medium 174.

Figure 8:
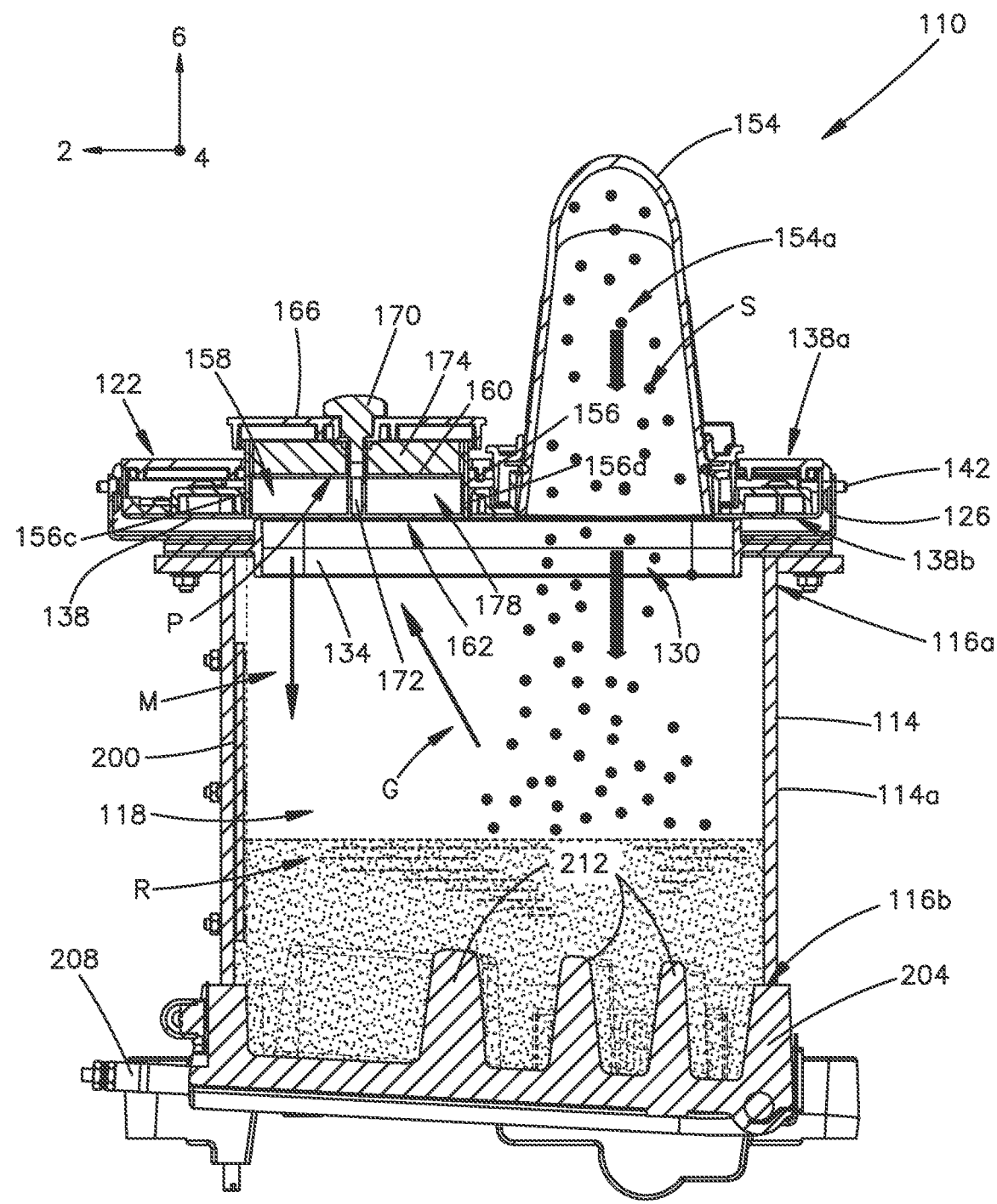
FIG. 8 illustrates the cross-sectional view of the melter shown in FIG. 2B, with adhesive within the receiving space.

Referring to FIG. 8, this self-cleaning process of the filter medium 174 will be described in greater detail. Initially, the transport supply gas G carries solid pellets S from the adhesive storage container 22 to the melter 110 through the input channel 154a of the input pipe 154, and the pellets fall into the receiving space 118. The solid pellets S can fall into a reservoir R of adhesive contained within the receiving space, where the reservoir R can comprise solid, melted, and partially melted adhesive. The transport supply gas G can increase a pressure within the reservoir R, causing the transport supply gas G to enter the filter medium 174 through the vent 164. The transport supply gas G can include small pieces of particulate, such as powder and/or pieces of pellets, that can be filtered by the filter medium 174 before exiting the melter 110 to avoid contamination of the surrounding environment. Once the filter medium 174 captures filtered adhesive particulates P from the transport supply gas G, the adhesive particulates P can adhere to the filter medium 174. However, heat ultimately created by the heater 208 but transferred to the housing 114, fins 212, transport supply gas G, and/or the reservoir R can melt the filtered material P into melted filtered material M. Once melted, the melted filtered material M can fall from the filter medium 174 and into the reservoir R, thus effectively cleaning the filter medium 174.

Figure 9B:
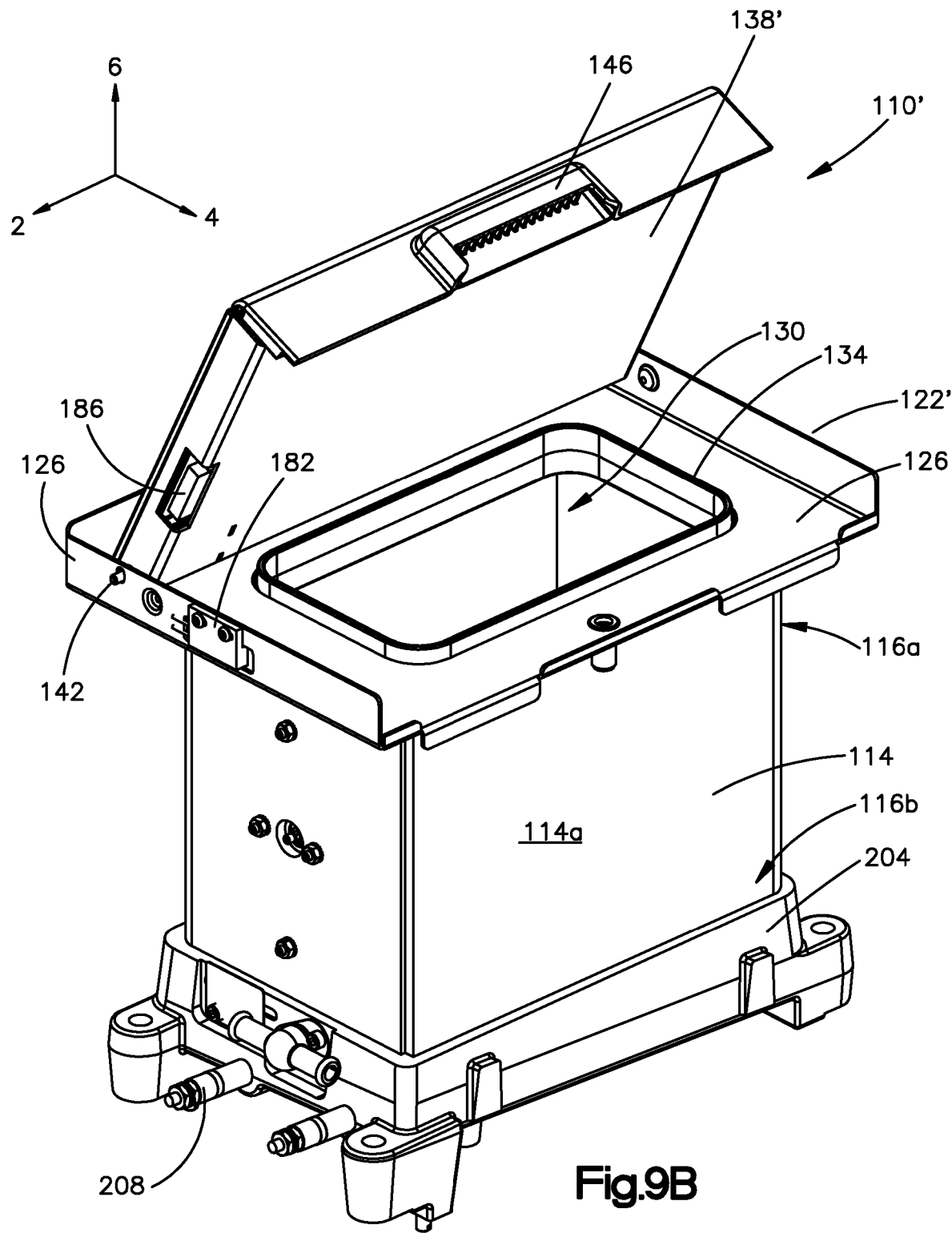
FIG. 9B illustrates a perspective view of the melter shown in FIG. 9A, with the lid assembly in an open position.

Referring to FIGS. 9A and 9B, another example of a melter 110' is shown. The melter 110' can include similar components to that of the melter 110, and as a result, matching components will be labeled similarly and not described here for brevity. Unlike the melter 110, the lid body 138' of the melter 110' does not include an input pipe or input channel. In contrast, the receiving space of the melter 110' can be filled manually by transitioning the lid assembly 122' from the closed position to the open position. The lid assembly 122' of the melter 110' can include a switch 180 configured to detect whether the lid assembly 122' is in the closed or open position. The switch 180 can include a sensor 182 and an actuator 186, where the sensor 182 is configured to detect movement of the actuator 186 relative to the sensor 182. As shown, the sensor 182 can be attached to the cover plate 126 while the actuator 186 is attached to the lid body 138', though other configurations are contemplated. In one example, the sensor 182 is a Hall effect sensor and the actuator 186 is a magnet. However, other examples of the switch 180 are contemplated. The switch 180 can be in signal communication with the controller 36 via a signal connection 44, which can be wired and/or wireless, so as to communicate signals to the controller 36 that are indicative of the opening and closing of the lid assembly 122'. This is useful for tracking and timing instances of the opening and closing of the lid assembly 122', as will be described further below.

Figure 10:
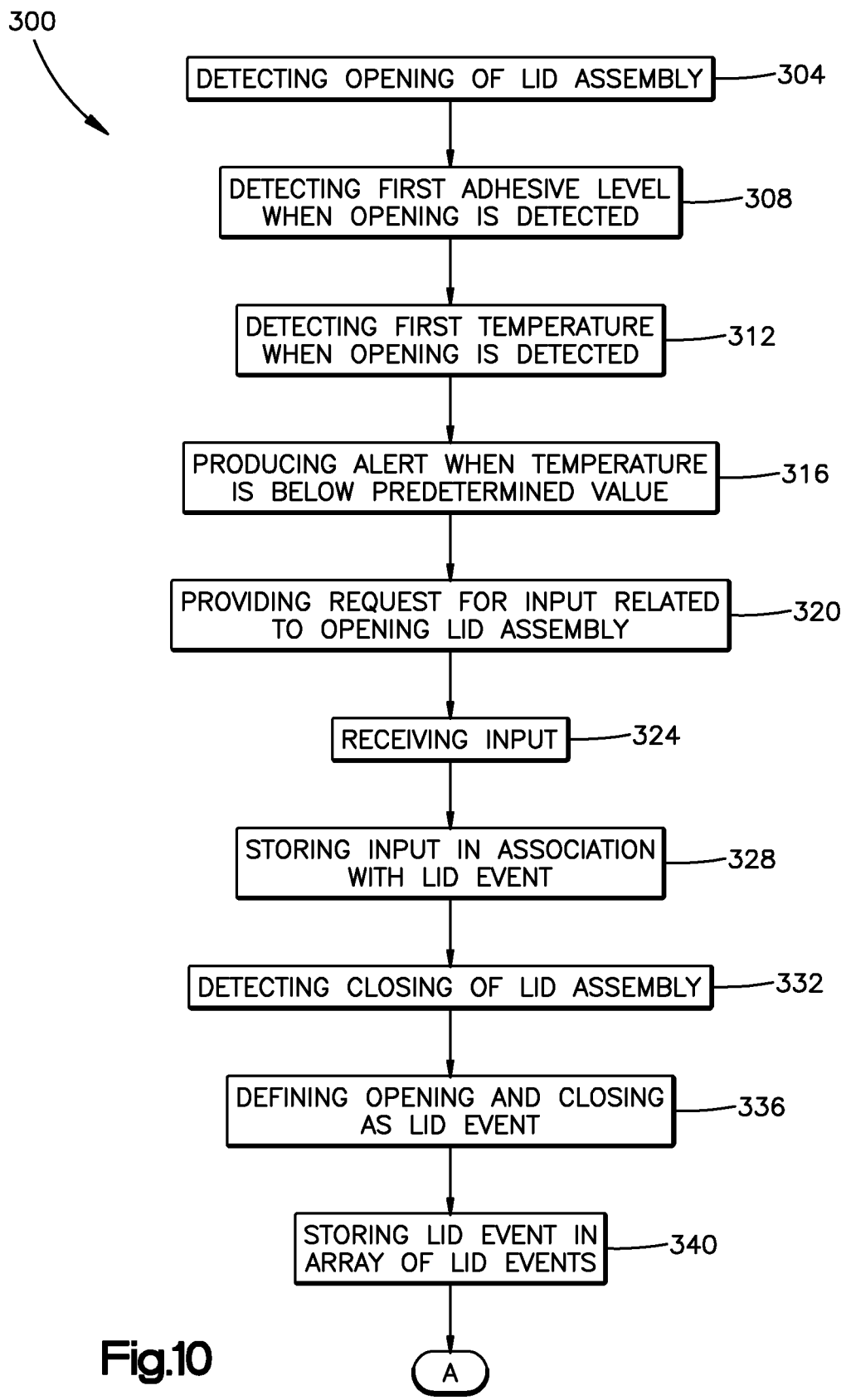
FIG. 10 illustrates a process flow diagram of a method of operating a melter according to an example of the present disclosure.
Figure 11:
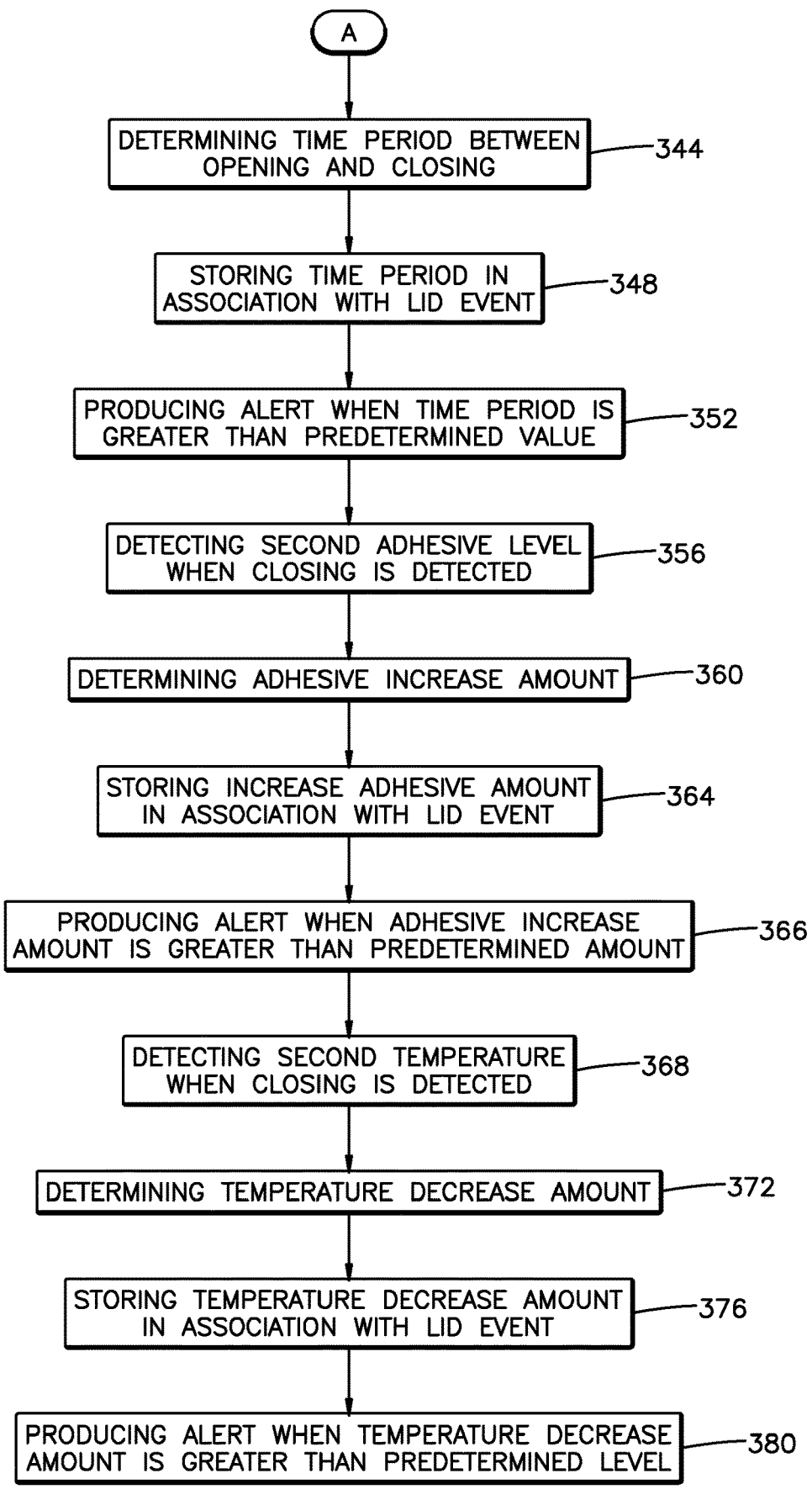
FIG. 11 illustrates a continuation of the process flow diagram shown in FIG. 10.

Now referring to FIGS. 10 and 11, a method 300 of operating a melter 110, 110' will be described. Step 304 involves detecting opening of the lid assembly 122 at a first time. Specifically, the switch 180 can detect opening of the lid assembly 122, 122' due to movement between the sensor 182 and the actuator 186, and subsequently communicate the detected opening to the control module 14. Step 308 can include detecting a first adhesive level in the receiving space 118 when the opening of the lid assembly 122, 122' is detected. As described above, the adhesive level within the receiving space 118 can be detected by the level sensor 200 and communicated to the controller 36. Step 312 can include detecting a first temperature in the receiving space 118 when the opening of the lid assembly 122, 122' is detected. The first temperature can be detected by the temperature sensor 202 and communicated to the controller 36. Then, in step 316 an alert can be produced when the first temperature is below a predetermined value. The alert can be produced by the HMI device 34, and can be in the form of a visual message, sound, vibration, light, etc. Opening the lid assembly 122, 122' when the receiving space 118 is below a particular temperature can result in breaking a portion of the lid assembly 122, 122'. As a result, when such an alert is produced, an operator can be reminded to wait until the temperature has risen above the predetermined value before opening the lid assembly 122, 122'.

Step 320 can include providing, via the HMI device 34, a request for an input related to opening the lid assembly 122, 122'. Then, in step 324 the HMI device can receive the input. In step 328, the input can be stored in association with the lid event. Steps related to requesting a reason for opening the lid assembly 122, 122' stem from the fact that it is desirable to open the lid as infrequently as possible to avoid the introduction of contaminants into the adhesive and the escape of gas from the receiving space 118 into the surrounding environment. As such, it is desirable to only open the lid assembly 122, 122' when there is a problem, to fill the receiving space 118, or for maintenance of the melter 110. In some examples, the request for an input can be provided as a plurality of predetermined input options. This input process helps promote best operating practices among operators and potentially modify operator behavior.

Step 332 can include detecting closing of the lid assembly 122, 122'. Specifically, the switch 180 can detect closing of the lid assembly 122, 122' due to movement between the sensor 182 and the actuator 186, and subsequently communicate the detected closing to the controller 36. Then, in step 336 the controller 36 can define opening and closing of the lid assembly as a lid event. In step 340, the controller 36 can store the lid event in an array of lid events. Storing the lid events in the controller 36 can be useful for future data logging and trend tracking, such as to determine patterns for particular adhesive dispensing devices, specific operators, etc. For example, one specific metric that the controller 36 can track based upon the lid events is the total number of lid events (opening and closing of the lid assembly 122, 122') that occur per day. An additional metric that the controller 36 can track is the total time over a particular time period that the lid assembly 122, 122' is in the open position.

In step 344, the controller 36 can determine a time period between opening the lid assembly 122, 122' at the first time and closing the lid assembly 122, 122' at the second time. Then, in step 348, the controller 36 can store the time period in association with the lid event. When the time period is greater than a predetermined level, an alert can be produced in step 352. This alert can be utilized to prompt an operator to close the lid assembly 122, 122' if filling, maintenance, or another necessary operation is no longer being performed, or rather to stop filling so as to prevent overfilling of the receiving space 118. Tracking lid assembly 122, 122' open time can be useful as it is desirable for the lid assembly 122, 122' to be open for the least amount of time possible for the reasons discussed above in relation to the number of open and close transitions for the lid assembly 122, 122'. Further, this metric can be used to change operator behavior, for example if the lid assembly 122, 122' is left open for excessive periods of time due to overfilling the receiving space 118, forgetfulness, etc. An overfill can occur when the operator has filled the receiving space 118 to such an extent that an amount of adhesive extends up through the opening 130, thus preventing the lid assembly 122, 122' from fully closing.

In step 356, a second adhesive level in the receiving space is detected when closing of the lid assembly 122, 122' is detected. As described above, the adhesive level within the receiving space 118 can be detected by the level sensor 200 and communicated to the controller 36. Then, in step 360, the controller 36 can determine an adhesive increase amount from the first adhesive level to the second adhesive level. In step 364, the controller 36 can store the adhesive increase amount in association with the lid event. Tracking the adhesive increase amount can be desirable, for example to assess the consistency of fill operations over time and to prevent overfilling. In step 366, an alert can be produced when the adhesive increase amount is greater than a predetermined amount.

In step 368, a second temperature in the receiving space 118 can be detecting when the closing of the lid assembly 122, 122' is detected. The second temperature can be detected by the temperature sensor 202 and communicated to the controller 36. Then in step 372, the controller 36 determines a temperature decrease amount from the first temperature to the second temperature. In step 376, the controller 36 stores the temperature decrease amount in association with the lid event. When the temperature decrease amount is greater than a predetermined level, an alert can be produced in step 380. The alert can correlate to a situation where the level before filling is particularly low, for example, leading to substantially decreased temperature in the receiving space 118 after filling.

By using the switch 180 within the lid assembly 122, 122' and other sensors to detect and track characteristics related to filling of the melter 110, 110', the operator can be continuously apprised of issues that may be occurring during or after filling of the receiving space 118, as described above, and subsequently take action to correct those issues. Additionally, the information can be tracked and logged for other reasons, such as potential upselling of products to the operator based upon logged data, correlating the information to system problems external to the melter, etc.

While various inventive aspects, concepts and features of the inventions may be described and illustrated herein as embodied in combination in the examples, these various aspects, concepts and features may be used in many alternative examples, either individually or in various combinations and sub-combinations thereof. Unless expressly excluded herein all such combinations and sub-combinations are intended to be within the scope of the present inventions. Still further, while various alternative examples as to the various aspects, concepts, and features of the inventions—such as alternative materials, structures, configurations, methods, devices and components, alternatives as to form, fit and function, and so on—may be described herein, such descriptions are not intended to be a complete or exhaustive list of available alternative examples, whether presently known or later developed. Those skilled in the art may readily adopt one or more of the inventive aspects, concepts or features into additional examples and uses within the scope of the present inventions even if such examples are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

While the invention is described herein using a limited number of examples, these specific examples are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired

What is claimed is:

1. A melter, comprising:
   a housing defining a receiving space configured to support adhesive therein;
   a heater configured to heat the receiving space of the housing to melt the adhesive, wherein the melter defines an adhesive inlet therein that is configured to receive adhesive carried by a transport supply gas into the receiving space;
   a vent that extends through a wall of the melter and that is configured to permit the transport supply gas to escape from the melter;
   a filter medium supported in the vent, the filter medium configured to capture particulates from the transport supply gas escaping the receiving space, and positioned relative to the receiving space such that heat from the receiving space causes the particulates captured by the filter medium to melt and fall into the receiving space; and
   a lid assembly attached to the housing, the lid assembly comprising a lid body that defines a grate that is open to a filter chamber.

2. The melter of claim 1, wherein the lid body defines the vent and supports the filter medium.

3. The melter of claim 1, wherein:
   the lid body defines an upper end, a lower end opposite the upper end, and the filter chamber, and
   the filter chamber extends into the lid body from the upper end of the lid body to the lower end and configured to receive the filter medium.

4. The melter of claim 3, wherein the lower end of the lid body defines the grate.

5. The melter of claim 4, wherein the lid body defines a filter support extending into the filter chamber and configured to support the filter medium, wherein the filter support is vertically spaced from the grate.

6. The melter of claim 1, wherein at least a portion of the lid assembly is configured to transition between a closed position, in which the lid assembly prevents manual access to the receiving space, and an open position, in which the lid assembly permits manual access to the receiving space.

7. The melter of claim 6, wherein the lid assembly includes a switch configured to detect whether the lid assembly is in the closed position or the open position.

8. The melter of claim 1, wherein the filter medium is positioned at a distance that is within a range of 0.0 inches to 3.0 inches from the receiving space.

9. The melter of claim 1, wherein the filter medium is supported relative to the receiving space such that there is at least one unobstructed, straight path from the filter medium to the receiving space.

10. The melter of claim 1, wherein the filter medium has a first surface that faces towards the receiving space, and a second surface opposite the first surface, wherein the first surface has a cross-sectional area that is greater than a cross-sectional area of the filter medium in a plane that is perpendicular to the first surface.

11. The melter of claim 3, wherein the lid assembly further comprises:
   a cover configured to releasably attach to the upper end of the lid body to secure the filter medium within the filter chamber.

12. The melter of claim 11, wherein the filter medium is configured to be removed from the receiving space when the cover is detached from the lid assembly.

* * * * *